(12) United States Patent
Amokwe et al.

(10) Patent No.: US 11,698,103 B2
(45) Date of Patent: Jul. 11, 2023

(54) CAGE SEGMENT OF A ROLLING BEARING (71) Applicant: Schaeffler Technologies AG & Co. KG, Herzogenaurach (DE)

(72) Inventors: Philip Amokwe, Niederwerrn (DE); Oliver Boersch, Röthlein (DE); Harry Günther, Schweinfurt (DE); Gerhard Schorr, Baunach (DE); Sascha Breithack, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 41 days.

(21) Appl. No.: 17/436,243

(22) PCT Filed: Jan. 27, 2020

(86) PCT No.: PCT/DE2020/100047
§ 371 (c)(1),
(2) Date: Sep. 3, 2021

(87) PCT Pub. No.: WO2020/177802
PCT Pub. Date: Sep. 10, 2020

(65) Prior Publication Data
US 2022/0154771 A1 May 19, 2022

(30) Foreign Application Priority Data

Mar. 4, 2019 (DE) ...................... 10 2019 105 473.7

(51) Int. Cl.
*F16C 33/51* (2006.01)
*F16C 33/38* (2006.01)
*F16C 33/50* (2006.01)

(52) U.S. Cl.
CPC ...... *F16C 33/3812* (2013.01); *F16C 33/3818* (2013.01); *F16C 33/50* (2013.01); *F16C 33/51* (2013.01)

(58) Field of Classification Search
CPC .. F16C 33/3812; F16C 33/3818; F16C 33/50; F16C 33/506; F16C 33/508; F16C 33/51
See application file for complete search history.

(56) References Cited

U.S. PATENT DOCUMENTS

| 821,882 A * | 5/1906 | Perkins .................. F16C 19/40 384/553 |
| 3,501,212 A * | 3/1970 | Husten .................... F16C 19/40 384/614 |
| 10,458,473 B2 * | 10/2019 | Meder ................... F16C 33/513 |

(Continued)

FOREIGN PATENT DOCUMENTS

| CN | 106369060 A | 2/2017 |
| CN | 108138847 A | 6/2018 |

(Continued)

*Primary Examiner* — Phillip A Johnson
(74) *Attorney, Agent, or Firm* — Volpe Koenig (57) ABSTRACT

A cage segment for a rolling bearing, in particular a taper roller bearing, includes: two side plates; at least two bridges connecting the two side plates; a complete rolling element pocket being between each pair of bridges; and an incomplete rolling element pocket formed by regions of the two side plates which project beyond the bridges in a circumferential direction of the cage segment. Two end faces of each side plate are contoured differently, in particular are convex in one case and flat in the other case.

17 Claims, 4 Drawing Sheets

(56) References Cited

U.S. PATENT DOCUMENTS

| | | | |
|---|---|---|---|
| 2013/0223780 A1 | 8/2013 | Mangold et al. | |
| 2017/0198752 A1* | 7/2017 | Hofmann | ............ F16C 33/4611 |
| 2019/0010985 A1 | 1/2019 | Capaldi | |

FOREIGN PATENT DOCUMENTS

| | | | |
|---|---|---|---|
| DE | 102008011112 A1 * | 8/2009 | .......... F16C 33/4611 |
| DE | 102015200381 A1 | 7/2016 | |
| DE | 102015205256 A1 | 9/2016 | |
| DE | 102015206533 A1 | 10/2016 | |
| DE | 102015219277 A1 | 4/2017 | |
| DE | 102016206072 A1 | 10/2017 | |
| DE | 102016210319 A1 | 12/2017 | |
| DE | 102017101034 A1 * | 7/2018 | |
| DE | 102017211488 A1 | 1/2019 | |
| GB | 178822 | 4/1922 | |
| GB | 825689 A * | 12/1959 | |
| GB | 1296976 A * | 11/1972 | |
| JP | 2007285507 A | 11/2007 | |
| JP | 2013167356 A * | 8/2013 | ............. F16C 19/30 |
| JP | 2013-174254 A | 9/2013 | |
| JP | 2015-152045 A | 8/2015 | |
| WO | 2010072197 A1 | 7/2010 | |

\* cited by examiner

CAGE SEGMENT OF A ROLLING BEARING

CROSS-REFERENCE TO RELATED APPLICATION

The present application is the U.S. national stage application pursuant to 35 U.S.C. § 371 of International Application No. PCT/DE2020/100047, filed 27 Jan. 2020, which application claims priority from German Patent Application DE 10 2019 105 473.7 filed 4 Mar. 2019, which applications are incorporated herein by reference in their entireties.

BACKGROUND

The present disclosure relates to a cage segment for use in a rolling bearing. The present disclosure also relates to a rolling bearing, in particular a roller bearing, which comprises a plurality of such cage segments.

A generic cage segment is known for example from DE 10 2015 219 277 A1. The known cage segment has two side plates and two bridges which are firmly connected to one another, the bridges extending parallel to the axes of rotation of the roll bodies of the rolling bearing. A pocket for receiving a roll body is formed by the side plates and the bridges. The two side plates extend on both sides of the pocket in the circumferential direction of the rolling bearing to such an extent that half pockets are also formed to accommodate an adjacent roll body.

Another cage segment of essentially the same design is described in DE 10 2016 210 319 A1. In this case, taper rollers are used as roll bodies. Accordingly, the pockets of the cage segment are trapezoidal.

A cage segment is known from DE 10 2015 206 533 A1, by means of which precisely one pocket for a roll body is formed. The cage segment is composed of a plurality of individual parts.

A cage segment composed of a plurality of individual parts is described in DE 10 2015 200 381 A1. The cage segment is to be inserted between two roll bodies. A pocket is not formed by the cage segment.

Individual segments of a segment cage are typically arranged with clearance in the circumferential direction within a rolling bearing. In a segmented rolling bearing cage described in WO 2010/072197 A1, individual cage segments are separated from one another by gaps, an upper limit being specified for the sum of all gap widths. This sum of all gap widths corresponds to the head end clearance of the cage segments, i.e., the clearance between the last and the first cage segment when all cage segments are pushed together.

A segmented rolling bearing cage described in DE 10 2015 205 256 A1 comprises a plurality of cage segments which are not dimensioned uniformly. Here, various different cage segments are inserted into the rolling bearing in such a way that a circumferential safety limit results.

SUMMARY

The object of the present disclosure is to specify a cage segment and a rolling bearing which, with a simple basic structure, are characterized by high operational reliability in a particularly broad spectrum of the most varied operating conditions.

The cage segment of the present disclosure comprises two side plates and at least two bridges connecting the side plates, a complete rolling element pocket being formed between each pair of bridges and an incomplete rolling element pocket being formed by regions of the side plates which project beyond the bridges in the circumferential direction of the cage segment. According to the present disclosure, the two end faces of each side plate are contoured differently.

A complete rolling element pocket is understood to be one where the side plates and two bridges of a cage segment enclose a roll body inserted into them. An incomplete rolling element pocket is one in which a roll body inserted into it is enclosed on three sides, i.e., by a bridge and two side plates of a cage segment.

For the sake of completeness, it is pointed out that an incomplete rolling element pocket is usually a half rolling element pocket. However, other combinations are also conceivable, provided that the incomplete rolling element pockets of two different cage segments result in a complete rolling element pocket again after the cage segments have been assembled.

The different contouring of the two end faces of each side plate, which are opposite one another in the circumferential direction of the rolling bearing, is also to be understood as meaning that there is no symmetry between the first and the second end face of a side plate. It has been shown that with an asymmetrical design of the side plates, compared to the prior art, there are improved possibilities for absorbing the forces acting on the cage segments during operation of the rolling bearing.

In an example embodiment, one of the end faces of a side plate is designed as a flat surface, while the other end face of the same side plate is convexly curved. The radius of curvature of the convexly curved end face, which, like the flat end face, represents an abutment surface, is matched to the number of roll bodies, to geometric features of the roll bodies, for example the pitch circle of the smaller roller face in the case of taper rollers, and to the dimensioning of the cage segments themselves. The bridge height of the cage segment and the side edge height to be measured on the side plate play a role here.

According to an example embodiment, the radius of curvature of the convexly curved end face is smaller than the distance between the two end faces, i.e., the length of the cage segment. In one example, the ratio of the radius of curvature (R) to the distance (LK) is between 30 and 50%. The cage segment is to be viewed with a viewing direction parallel to the central axis of the rolling bearing. In an example embodiment, there is also a curvature of the end face in a direction orthogonal thereto. The convexly curved end face thus represents a spatially curved surface which cannot be expanded into a flat surface. For example, the curved end face is a spherically curved surface, i.e., a surface which describes a surface section of a sphere. In various designs of the convexly curved surface, there is point contact with the support of the pressure ellipse between the abutting cage segments, even with maximum tilting of the cage segment in all directions. Edge tensions are thus avoided.

As far as the installation of the cage segments in a rolling bearing is concerned, a fundamental difference compared to the prior art is a negative head end clearance. The head end clearance is defined as follows.

It is assumed that during assembly, n-1 equally dimensioned cage segments are placed against each other on the inner ring of the rolling bearing. When a last cage segment, corresponding to the dimensioning of the remaining cage segments, is to be inserted without force into the resulting gap between arranged n-1 cage segments, it is customary to dimension all cage segments so that the gap, which occurs after the arrangement of n-1 cage segments, is slightly larger than the dimensions of the last cage segment. When the last cage segment is then placed on the rolling bearing inner ring, the larger gap inevitably results in a head end clearance between an end face of the last cage segment and an end face of the first cage segment. Consequently, a negative head end clearance is synonymous with the fact that the last cage segment can no longer be inserted into the rolling bearing in the manner described.

In order to insert all cage segments into the rolling bearing, the cage segments must be lifted at least slightly from the rolling bearing inner ring so that after the assembly of the last cage segment, the cage thus formed maintains a small radial distance from the respective bearing ring, i.e., in a theoretical view the mounted cage is arranged floating above the rolling bearing inner ring. This floating arrangement of the cage segments means that there is no or only a very little operating clearance between the cage segments during operation of the bearing, as the following shows.

For this purpose, the cage formed from cage segments is first considered as a closed ring in which all cage segments are connected to one another in accordance with a non-segmented cage. When such a cage ring is installed in a radial bearing, this closed cage ring loses its central position to the bearing axis of rotation due to the force of gravity, in that the 12 o'clock position of the cage ring approaches the rolling bearing inner ring within the limits of the pocket clearance even without load on the bearing, while the 6 o'clock position of the cage ring moves slightly away from the rolling bearing inner ring.

However, when the cage segments are not connected to one another, there is also a slight ovalization in addition to the shift in the 6 or 12 o'clock direction, as the cage segments are pulled apart slightly by the force of gravity. When the cage segments are not floating after assembly due to the negative head end clearance, per the present disclosure, but the cage segments are already in contact with the rolling bearing inner ring after assembly, the cage segments cannot approach the rolling bearing inner ring in the 12 o'clock position. As a result, the operating clearance is determined solely by the displacement of the cage segments in the 6 o'clock position. When, however, the floating arrangement of the cage segments also creates a possibility of displacement in the 12 o'clock position, the operating clearance is eliminated or at least minimized by this displacement.

In an example embodiment, the two side plates of the cage segment have lateral surface sections spaced from the end faces, which are offset from the surrounding surface sections of the side plates in such a way that the maximum width of the cage segment to be measured in the axial direction of the rolling bearing is given exclusively by the distance between the lateral, offset surface sections of the two side plates.

This above configuration enables a particularly stable connection of the bridges to the side plates. When the lateral, raised surface sections of the cage segment come into contact with other components, in particular bearing rings, the reduced contact surface compared to a flat side plate also results in a behavior that is optimized in terms of lubrication. In an example embodiment, lateral surface sections, i.e., the raised sections which determine the maximum width of the cage segment, are located in a straight extension of the two bridges, the bridges being oriented orthogonally to the surface sections mentioned. This means that straight lines laid through the bridges and running in their longitudinal direction also intersect two of the offset surface sections of the side plates.

According to an example embodiment which is suitable for use in taper roller bearings, at least one guide nose for guiding a roll body located in the rolling element pocket projects from each bridge. These guide noses ensure that the cage or the cage segments forming the cage are guided by the roll bodies between about 3 and 9 o'clock, but cause significantly lower friction losses in comparison to a pure, continuous rim or raceway guide due to low surface contact of the cage or cage segments with the roll bodies.

When the side plates have protruding nubs, the direction of extension of which is opposite to the direction of extension of the guide noses, this results in advantages in manufacturing. The nubs serve as defined support points for subsequent processing steps, for which the exact position of the segment in space must be known.

When the roll bodies inserted in the complete and incomplete rolling element pockets maintain a clearance S1 and S2, respectively, in the direction of the axis of rotation of the roll bodies to inner surfaces of one of the side plates, and when the clearance S1 of the roll bodies in the incomplete pockets is greater than the clearance S2 of the roll bodies in the complete pocket, restricting roll bodies arranged in incomplete pockets cannot exert any loads on the side plates. Likewise, side plates of taper cage segments cannot come into contact with the roll bodies which are arranged in incomplete pockets.

In an example embodiment, regardless of the type of roller-shaped roll bodies for which the cage segment is designed, the inner surfaces of the side plates facing the complete rolling element pocket or the incomplete rolling element pockets are designed as smooth-walled surfaces—with the exception of transition regions to the bridges. On one of the side plates, the smooth-walled surfaces that extend from one of the bridges in the direction of the bridges adjacent in the circumferential direction, together with the smooth-walled surfaces that run from the adjacent bridges towards this bridge, form an angle $\beta$ that is less than 180°, the centers between two adjacent bridges are slightly recessed compared to the edges of the converging surfaces near the bridge. As a result of this design, only the regions of the smooth-walled surfaces close to the bridges come into physical contact with the roller end faces, which reduces the friction between roller end faces on the smooth-walled surfaces.

In an example embodiment, the cage segment is made of metal. Any known methods, for example cutting and forming methods, such as casting, can be used.

In an example embodiment, a rolling bearing which has a segmented cage formed by the cage segments is designed as a taper roller bearing, cylindrical roller bearing, or spherical roller bearing. In an example embodiment, in the case of a multi-row bearing, several rows of cage segments are provided. Large bearings, for example in wind power plants, are a field of application for the cage segments.

BRIEF DESCRIPTION OF THE DRAWINGS

In the following, an exemplary embodiment of the present disclosure is explained in more detail by means of a drawing. In the figures.

DETAILED DESCRIPTION

Figure 1:
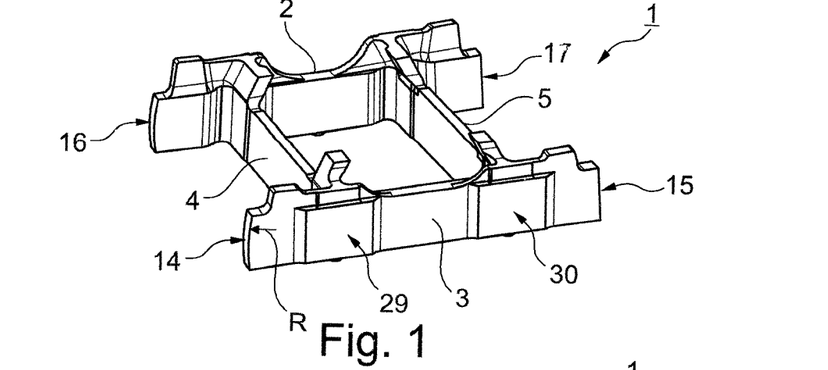
FIG. 1 shows a cage segment for a rolling bearing in a perspective view.
Figure 2:
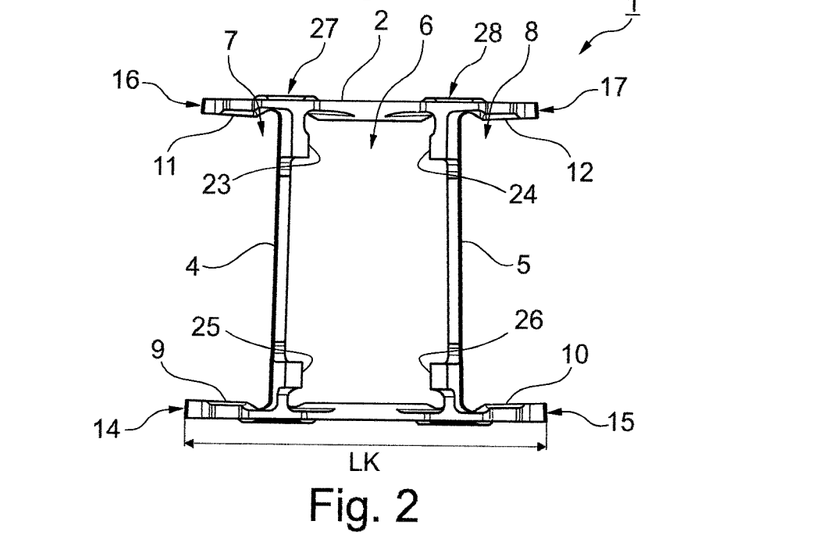
FIGS. 2 to 4 show the cage segment in further views.
Figure 3:
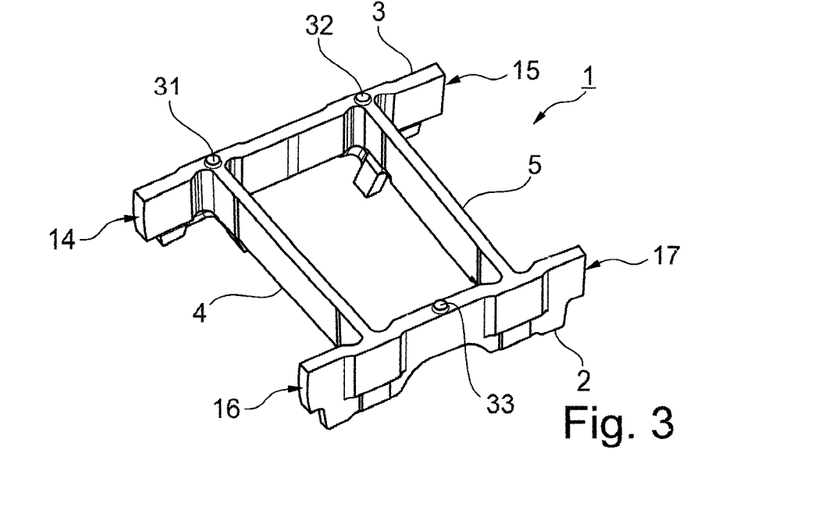

A cage segment marked overall with reference sign 1 is provided for use in rolling bearing 20, namely a taper roller bearing. In the example of FIG. 1, cage segment 1 is a one-piece metal part which has side plates 2, 3 and bridges 4, 5 connecting side plates 2, 3. In the example of FIG. 1, cage segment 1 is made of steel. Between side plates 2, 3 and bridges 4, 5 there is pocket 6, i.e., a complete rolling element pocket, for a taper roller as roll body 13 (not shown in FIGS. 1-4). Side plates 2, 3 and bridges 4, 5 of cage segment 1 completely surround roll body 13. In addition, incomplete rolling element pockets 7, 8 are formed by cage segment 1, and are arranged in the circumferential direction next to pocket 6. Each incomplete rolling element pocket 7, 8 is delimited by a bridge 4, 5 and a leg 9, 10, 11, 12 of a side plate 2, 3. The leg 9 is spaced apart from the leg 11 by the bridge 4. The same applies to the leg 10, which, however, lies opposite the leg 10 at a distance from the bridge 5.

In an example embodiment, cage segment 1 has more than one complete rolling element pocket 6 which completely surrounds roll bodies 13 inserted therein.

In the circumferential direction of rolling bearing 20, each side plate 2, 3 is delimited by end faces 14, 15, 16, 17. Here, end face 14 is formed by leg 9 and end face 15 is formed by leg 10. In a corresponding manner, end faces 16, 17 are formed by legs 11, 12 of side plate 2. During operation of rolling bearing 20, end faces 14, 15, 16, 17 represent contact surfaces at which cage segments 1 come into contact with one another, as can be seen from FIG. 6. The distance measured in the circumferential direction of rolling bearing 20 between end faces 14, 15 of cage segment 1 represents length LK of cage segment 1.

End faces 14, 16 are convexly curved surfaces, the radius of curvature of which is denoted by R. End faces 15, 17, however, are flat surfaces. When cage segments 1 are completed by stringing segments 1 together in the circumferential direction to form a cage, convexly curved end faces 14, 16 of a first cage segment 1 are in contact with flat end faces 15, 17 of a second cage segment 1 immediately following in the circumferential direction, while flat bridge surfaces 15, 17 of the first cage segment 1 are in contact with convexly curved end faces 14, 16 of a third cage segment 1 lying opposite the second cage segment 1 in the circumferential direction. This contact of flat and convexly curved surfaces has the effect that, regardless of the tilt between two adjacent cage segments 1, comparable contact surfaces are always formed by end faces 14, 15, 16, 17 during operation of roller bearing 20.

Roll bodies 13, for example case taper rollers, which are located in complete rolling element pockets 6 and incomplete rolling element pockets 7, 8, roll on inner ring 18, the raceway of which is denoted by 19. Inner ring 18 has rims 21, 22 of different heights adjacent to raceway 19. Inner ring 18 and cage segments 1 are dimensioned in such a way that not all of cage segments 1 can completely rest on inner ring 18 at the same time. This is synonymous with the fact that the head end clearance, which theoretically results when the last cage segment 1 is inserted, is negative. Within fully assembled rolling bearing 20, at least some of cage segments 1 are thus lifted off inner ring 18, which is referred to as a floating arrangement of cage segments 1.

On the side of cage segment 1 facing inner ring 18, guide lugs 23, 24, 25, 26 are formed on bridges 4, 5, which contact roll body 13 inserted into closed pocket 6. In this exemplary embodiment, two guide noses 23, 25 and 24, 26 each protrude from respective bridges 4, 5 near side plates 2, 3. In another exemplary embodiment, two guide noses 23, 25; 24, 26 each provided by means of a bridge 4; 5 also are formed by a common guide nose (not shown), which then extends as a mere guide nose between side plates 2, 3.

Side plates 2, 3 have, in each case in a straight extension of bridges 4, 5, a total of four offset surface sections 27, 28, 29, 30. Each surface section 27, 28, 29, 30 has a rectangular basic shape, surface sections 27, 28 being formed by side plate 2 and raised from adjacent surface regions of side plate 2. Surface sections 29, 30 are lifted out of the rest of side plate 3 in a corresponding manner. Insofar as side plates 2, 3 contact other components when cage segment 1 is installed, the corresponding contact only exists on raised surface sections 27, 28, 29, 30, but not on other lateral surface sections of side plates 2, 3.

On the side of cage segment 1 facing the outer ring (not shown) of roller bearing 2, i.e., facing away from guide noses 23, 24, 25, 26, side plates 2, 3 have a total of three nubs 31, 32, 33, which facilitate the positioning of cage segments 1 during assembly. There are two nubs 31, 32 at the transitions between side plate 3 and bridges 4, 5. Another nub 33 is located on side plate 2 in the center between bridges 4, 5.

Figure 5:
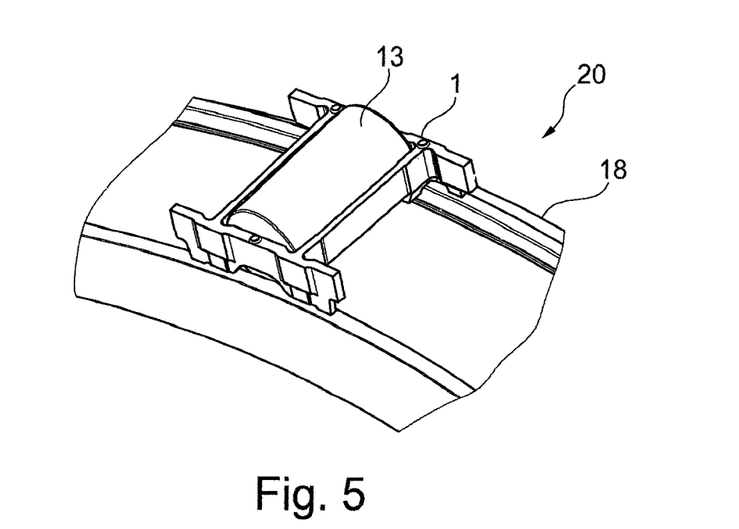
FIG. 5 shows an arrangement of the cage segment, a roll body and a bearing ring.
Figure 6:
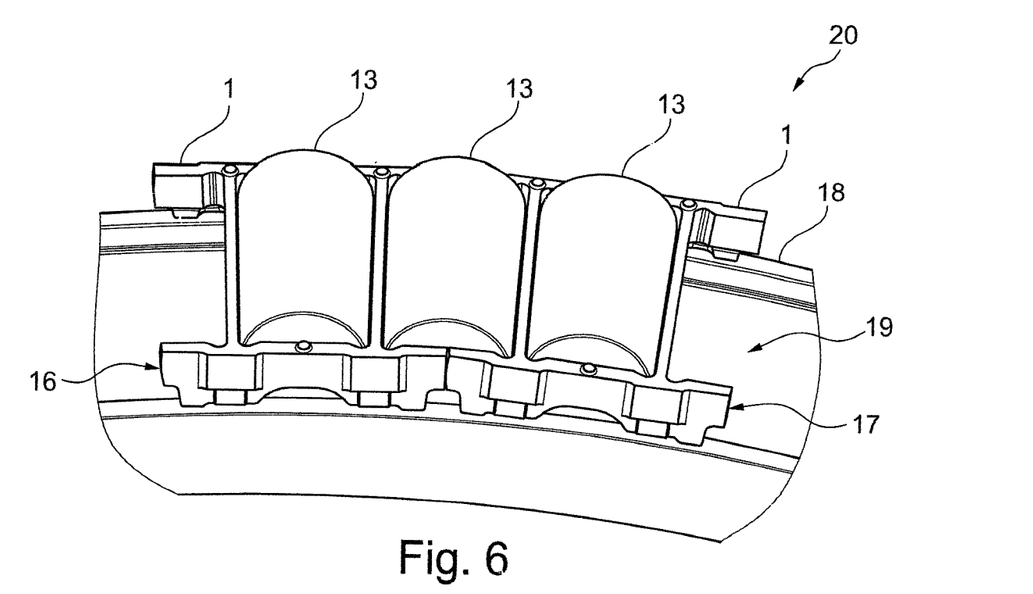
FIG. 6 shows an arrangement of two cage segments, three roll bodies and a bearing ring.
Figure 7:
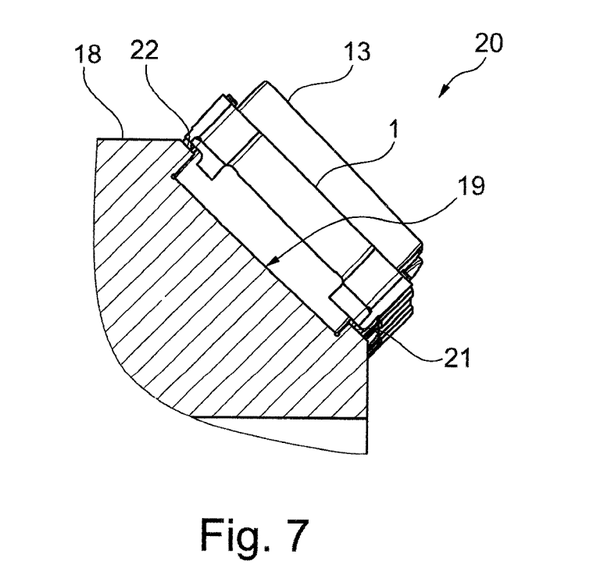
FIG. 7 shows the arrangement according to FIG. 6 in a further view.

As can be seen from FIGS. 5 to 7, the end faces of roll bodies 13 contact side plates 2, 3. Within pocket 6, roll bodies 13 run against flat surfaces 34 which extend over the greater part of the distance between bridges 4, 5. On legs 9, 10, 11, 12 of side plates 2, 3 protruding beyond complete rolling element pocket 6 and forming incomplete rolling element pockets 7, 8, surfaces 35 are formed in an analogous manner, each of which extends over most of the length of the relevant leg 9, 10, 11, 12. In the transition regions between bridges 4, 5 and surfaces 34, 35 rounded recesses 36 are formed which prevent undesired contacts between roll bodies 13 and pocket 6 or half pockets 7, 8 and also tension peaks in the transition regions between bridges 4, 5 and side plates 2, 3.

Figure 4:
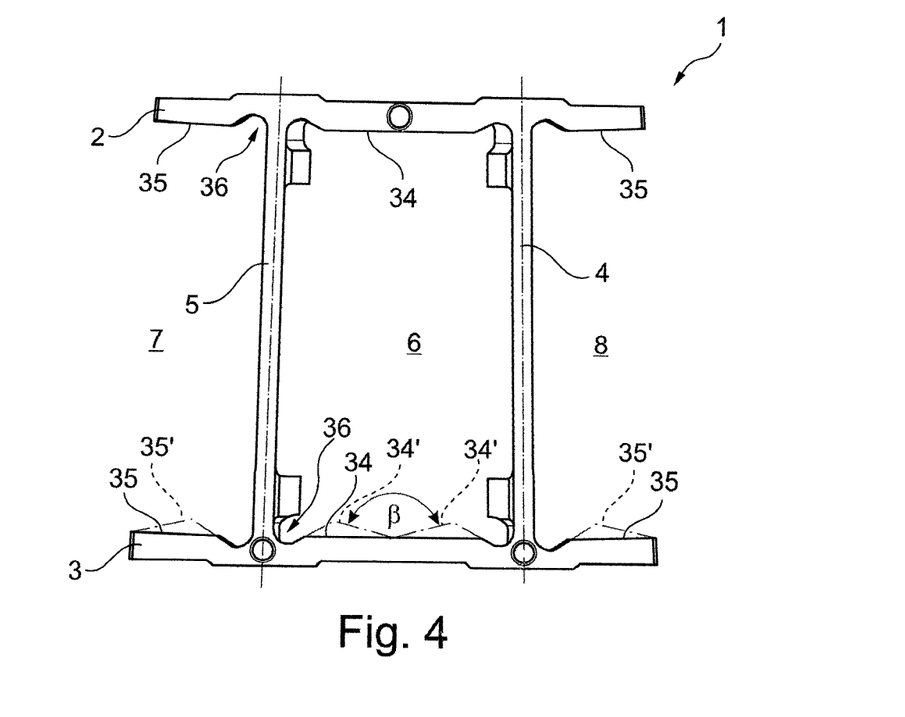

As indicated by the dashed lines in FIG. 4, it is not necessary for smooth-walled surfaces 34, 35 to run completely flat between two adjacent bridges 4, 5 of one or an adjacent cage segment 1. Thus, as shown in the example of FIG. 4 and for side plate 3, surfaces 34', 35' emanating from bridges 4, 5 and converging towards bridges 4; 5 immediately adjacent to the bridges 4, 5 form an angle β with surfaces 34', 35' emanating from adjacent bridges 4, 5 and converging again towards adjacent bridge 4, 5. In the example of FIG. 4, angle β is about 135°. Even when angle β only applies to surfaces 34' that extend from adjacent bridges 4, 5 of a cage segment 1, this angular relationship naturally also applies if two incomplete pockets 7, 8 of adjacent cage segments 1 form a common pocket. In that the angular course of converging surfaces 34', 35' creates a V-shaped inner contour which excludes center contact with the end faces of roll bodies 13 (not shown in FIG. 4) inserted into pockets 6, 7, 8, there are advantages in terms of guidance and friction.

Figure 8:
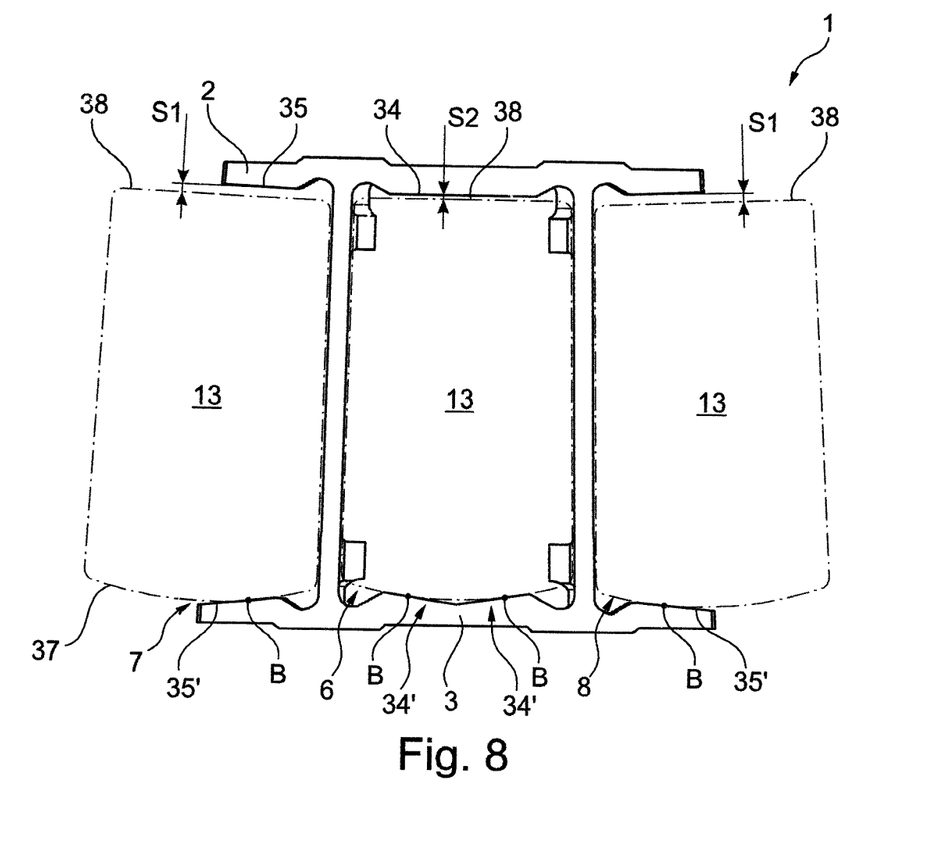
FIG. 8 shows a cage segment according to FIG. 4 with received roll bodies.

FIG. 8 shows cage segment 1 according to FIG. 4. In FIG. 8, for cage segment 1, converging surfaces 34', 35' do not only indicate an angle β, and pockets 6, 7, 8 are already filled with roll bodies 13 in the form of taper rollers. All taper rollers have the same dimensions. As the illustration according to FIG. 8 shows, rounded end faces 37 of roll bodies 13 are in contact at the contact points B with surfaces 34', 35'. It can be clearly seen from the illustration in FIG. 8 that straight end faces 38 of two tapered rollers 13, which are arranged in incomplete pockets 7, 8, maintain clearance S1 to surfaces 35 which is greater than clearance S2 which straight end face 38 of the tapered roller arranged in complete pocket 6 maintains to surface 34. This increased clearance S2, which in this exemplary embodiment was created by simply reducing the thickness of side plates 3 in the region of incomplete pockets 7, 8, has the effect of preventing taper rollers 13 in incomplete pockets 7, 8 from loading side plates 2, 3 during operation.

Due to already mentioned raised surface sections 27, 28, 29, 30, side plates 2, 3 are also sufficiently thick in the transition regions between bridges 4, 5 and side plates 2, 3. Offset surface sections 27, 28, 29, 30 also ensure that when rolling bearing 20 is in operation, differently shaped end faces 14, 15, 16, 17 only butt against one another, but not against surrounding components, such as a bearing ring.

The combination of convexly curved end faces 14, 16 and flat end faces 15, 17 provides an approximately uniform load situation for all cage segments 1, regardless of the exact angular position of individual cage segments 1 within rolling bearing 20. Wear of cage segments 1 plays practically no role in the operation of rolling bearing 20.

LIST OF REFERENCE SYMBOLS

1 Cage segment
2 Side plate
3 Side plate
4 Bridge
5 Bridge
6 Pocket
7 Half pocket
8 Half pocket
9 Leg of the half pocket
10 Leg of the half pocket
11 Leg of the half pocket
12 Leg of the half pocket
13 Roll body
14 End face, convex
15 End face, flat
16 End face, convex
17 End face, flat
18 Inner ring
19 Raceway
20 Rolling bearing
21 Rim
22 Rim
23 Guide nose
24 Guide nose
25 Guide nose
26 Guide nose
27 Offset surface section
28 Offset surface section
29 Offset surface section
30 Offset surface section
31 Nub
32 Nub
33 Nub
34 Surface
35 Surface
36 Recess
37 End face, curved
38 End face, flat
β Angle
LK Length of the cage segment
R Radius of the convex end face
B Point of contact
S1, S2 Clearance

The invention claimed is:
1. A segment of a cage for a rolling bearing, comprising:
a first side plate;
a second side plate;
a first bridge connecting the first side plate and the second side plate; and,
a second bridge connecting the first side plate and the second side plate, wherein:
the first side plate includes:
a first region extending past the first bridge in a first circumferential direction around an axis of rotation of the cage, the first region including a first end face having a first contour; and,
a second region extending past the second bridge in a second circumferential direction, opposite the first circumferential direction, the second region including a second end face having a second contour different from the first contour;
the second side plate includes a third region extending past the first bridge in the first circumferential direction the first side plate, the second side plate, the first bridge, and the second bridge define a complete rolling element pocket;
the first region, the first bridge, and the third region define a first incomplete rolling element pocket open in the first circumferential direction;
the first contour is convexly curved; and,
the second contour is flat.
2. The segment of a cage of claim 1, wherein:
the first end face is separated from the second end face by a distance in the first circumferential direction; and,
the first end face has a radius of curvature less than the distance.
3. The segment of a cage of claim 1, wherein:
the second side plate includes a fourth region extending past the second bridge in the second circumferential direction;
the third region includes a third end face having the first contour; and,
the fourth region includes a fourth end face having the second contour.
4. The segment of a cage of claim 3, wherein:
the second region, the second bridge, and the fourth region define a second incomplete rolling element pocket open in the second circumferential direction.
5. The segment of a cage of claim 1, wherein:
the first side plate includes a first lateral surface protrusion located past the first region in a first axial direction parallel to the axis of rotation;
the second side plate includes a second lateral surface protrusion located past the third region in a second axial direction, opposite the first axial direction; and,
a maximum width of the segment of the cage in the first axial direction is between the second lateral surface protrusion and the first lateral surface protrusion.
6. The segment of a cage of claim 5, wherein:
the first lateral surface protrusion is aligned with the first bridge in the first axial direction; and,
the second lateral surface protrusion is aligned with the second bridge in the second axial direction.
7. The segment of a cage of claim 1, wherein:
an axial direction is parallel to the axis of rotation;
a first direction is orthogonal to the axial direction and to the first circumferential direction;

the first bridge includes at least one first guide nose extending in the first direction and in the second circumferential direction, and arranged to contact a rolling element; and, the second bridge includes at least one second guide nose extending in the first direction and in the first circumferential direction and arranged to contact the rolling element.

8. The segment of a cage of claim 1, wherein:
the second side plate includes a surface facing the first side plate; and,
the first side plate includes a first surface and a second surface facing the second side plate and forming an angle smaller than 180 degrees.

9. A segment of a cage for a rolling bearing, comprising:
a first side plate;
a second side plate;
a first bridge connecting the first side plate and the second side plate; and,
a second bridge connecting the first side plate and the second side plate, wherein:
the first side plate includes:
a first region extending past the first bridge in a first circumferential direction around an axis of rotation of the cage, the first region including a first end face having a first contour; and,
a second region extending past the second bridge in a second circumferential direction, opposite the first circumferential direction, the second region including a second end face having a second contour different from the first contour;
the second side plate includes:
a third region extending past the first bridge in the first circumferential direction, the third region having a third end face with the first contour; and,
a fourth region extending past the second bridge in the second circumferential direction, the fourth region having a fourth end face with the second contour;
the first side plate, the second side plate, the first bridge, and the second bridge define a complete rolling element pocket;
the first region, the first bridge, and the third region define a first incomplete rolling element pocket open in the first circumferential direction; and,
the second region, the second bridge, and the fourth region define a second incomplete rolling element pocket open in the second circumferential direction;
the first contour is convexly curved; and,
the second contour is flat.

10. The segment of a cage of claim 9, wherein:
the first end face is separated from the second end face by a distance in the first circumferential direction; and
the first end face is convexly curved and has a radius of curvature less than the distance.

11. A portion of a roller bearing, comprising:
an inner ring;
a cage connected to the inner ring and including:
a first cage segment with a first side plate, a second side plate, a first bridge connecting the first side plate and the second side plate, and a second bridge connecting the first side plate and the second side plate; and,
a second cage segment with a third side plate, a fourth side plate, a third bridge connecting the third side plate and the fourth side plate, and a fourth bridge connecting the third side plate and the fourth side plate; and,
a plurality of rolling elements, wherein:
the first side plate includes a first region extending past the first bridge in a first circumferential direction around an axis of rotation of the cage, the first region including a first end face having a first contour;
the third side plate includes a second region extending past the fourth bridge in a second circumferential direction, opposite the first circumferential direction, the second region including a second end face in contact with the first end face and having a second contour different from the first contour;
the first region, the first bridge, the second side plate, the fourth side plate, the fourth bridge, and the second region form a first rolling element pocket; and,
a first rolling element is disposed in the first rolling element pocket;
the first contour is convexly curved; and
the second contour is flat.

12. The portion of a roller bearing of claim 11, wherein:
the second side plate includes a third region extending past the first bridge in the first circumferential direction, the third region having a third end face with the first contour; and,
the fourth side plate includes a fourth region in contact with the third end face and having the second contour.

13. The portion of a roller bearing of claim 12, wherein:
the first contour is convexly curved; and,
the second contour is flat.

14. The portion of a roller bearing of claim 11, wherein:
the first side plate, the first bridge, the second side plate, and the second bridge form a second rolling element pocket;
a second rolling element is disposed in the second rolling element pocket;
the third side plate, the third bridge, the fourth side plate, and the fourth bridge form a third rolling element pocket; and,
a third rolling element is disposed in the third rolling element pocket.

15. The portion of a roller bearing of claim 11, wherein:
the first side plate includes a third region extending past the second bridge in the second circumferential direction and including a third end face with the second contour;
the first end face is separated, in the first circumferential direction, from the third end face by a distance; and,
the first end face is convexly curved and has a radius of curvature less than the distance.

16. The portion of a roller bearing of claim 11, wherein:
the second side plate includes a surface facing the first side plate;
the first side plate includes a first surface and a second surface; and,
the first surface and the second surface face the second side plate and form an angle smaller than 180 degrees.

17. The portion of a roller bearing of claim 11, wherein:
the second side plate includes a third region extending past the first bridge in the first circumferential direction;
the first region, the first bridge, and the third region form an incomplete rolling element pocket;
the first rolling element is disposed in the incomplete rolling element pocket;
the first side plate, the first bridge, the second side plate, and the second bridge form a complete rolling element pocket;

a second rolling element is disposed in the complete rolling element pocket;
when the first rolling element contacts the first region, the first rolling element is separated from the third region by a first distance; and,
when the second rolling element contacts the first side plate, the second rolling element is separated from the second side plate by a second distance, less than the first distance.

* * * * *